United States Patent [19]

Waller et al.

[11] 4,261,008
[45] Apr. 7, 1981

[54] DUAL STANDARD COLOR FRAMER

[75] Inventors: Lloyd E. Waller, Pine Hill; George S. Zorbalas, Cherry Hill, both of N.J.

[73] Assignee: RCA Corporation, New York, N.Y.

[21] Appl. No.: 112,400

[22] Filed: Jan. 15, 1980

[51] Int. Cl.³ ............................................. H04N 9/46
[52] U.S. Cl. .......................................... 358/19; 358/4
[58] Field of Search ........................... 358/4, 8, 17, 19

[56] References Cited

U.S. PATENT DOCUMENTS

| 3,567,862 | 3/1971 | Carnt et al. | |
|---|---|---|---|
| 4,052,733 | 10/1977 | Derenbecher, Jr. | 358/10 |
| 4,101,926 | 7/1978 | Dischert et al. | 358/17 |

Primary Examiner—Robert L. Richardson
Attorney, Agent, or Firm—Paul J. Rasmussen; William H. Meise; Henry I. Steckler

[57] ABSTRACT

A color framing circuit is usable for both PAL & NTSC video signals. To do this, it detects the direction of zero crossings of the color burst with respect to the preceding horizontal sync pulse for at least two consecutive lines.

8 Claims, 4 Drawing Figures

DUAL STANDARD COLOR FRAMER

BACKGROUND OF THE INVENTION

The present invention relates to color framers, and more particularly, to those that are usable with both NTSC and PAL signals.

During video editing, a capstan servo is used to ensure that synchronization exists between a video tape being played back and the video input of the VTR. This works well for monochrome, but for color signals it is necessary to also synchronize the phase relationship of the color burst zero crossings to the horizontal synchronization pulse for the played back and reference video signals.

This relationship for an NTSC signal is given below in Table I, where + indicates a positive going color burst zero crossing with respect to synchronization pulse relationship, and − indicates a negative going such relationship. The color burst and the horizontal synchronization pulse do not occur at the same time. However, since the color burst starts an integer number of cycles from the start of the horizontal synchronization pulse, this relationship is the same as if they occurred at the same time.

TABLE I

| | (NTSC) | | | |
|---|---|---|---|---|
| | | Line | | |
| Frame | 1 | 2 | 3 | 4 |
| 1 | + | − | + | − |
| 2 | − | + | − | + |
| 3 | + | − | + | − |
| 4 | − | + | − | + |
| 5 | + | − | + | − |

In the above table all relationships are for field one of the frame in question. It will be noted that the phase relationship can only be off, if it is off at all, by only one frame. It is necessary to sample only one line per frame to determine enough information to achieve proper framing.

Table II below shows the same kind of relationship for field one of the frame in question for a PAL signal.

TABLE II

| | | Line | | |
|---|---|---|---|---|
| Frame | 1 | 2 | 3 | 4 |
| 1 | + | + | − | − |
| 2 | + | − | − | + |
| 3 | − | − | + | + |
| 4 | − | + | + | − |
| 5 | + | + | − | − |

The sequence above repeats after the fourth line, e.g. line 5 is the same as line 1 of the same frame and field, etc. It will be noted however, that the phase relationship can be off up to a maximum of three frames, e.g. if capstan lock up occurs on frame 2 when it should have been frame 1, then it will be necessary to go to frame 5 to obtain the same phase relationship for proper frame lock up. Further it is necessary to sample two lines per frame to obtain enough information to achieve proper framing.

Up till now, if it was desired to use a single framing circuit unit for both NTSC & PAL, it was necesssary to replace a module in the unit when switching from one standard to the other one due to the above described differences.

It is therefore desired to have a framer that can be used for both PAL and NTSC without changing modules.

SUMMARY OF THE INVENTION

In brief, this is achieved by having a framing unit with a zero crossing detector that determines the direction of zero crossings for at least two consecutive lines.

DETAILED DESCRIPTION

Figure 1:
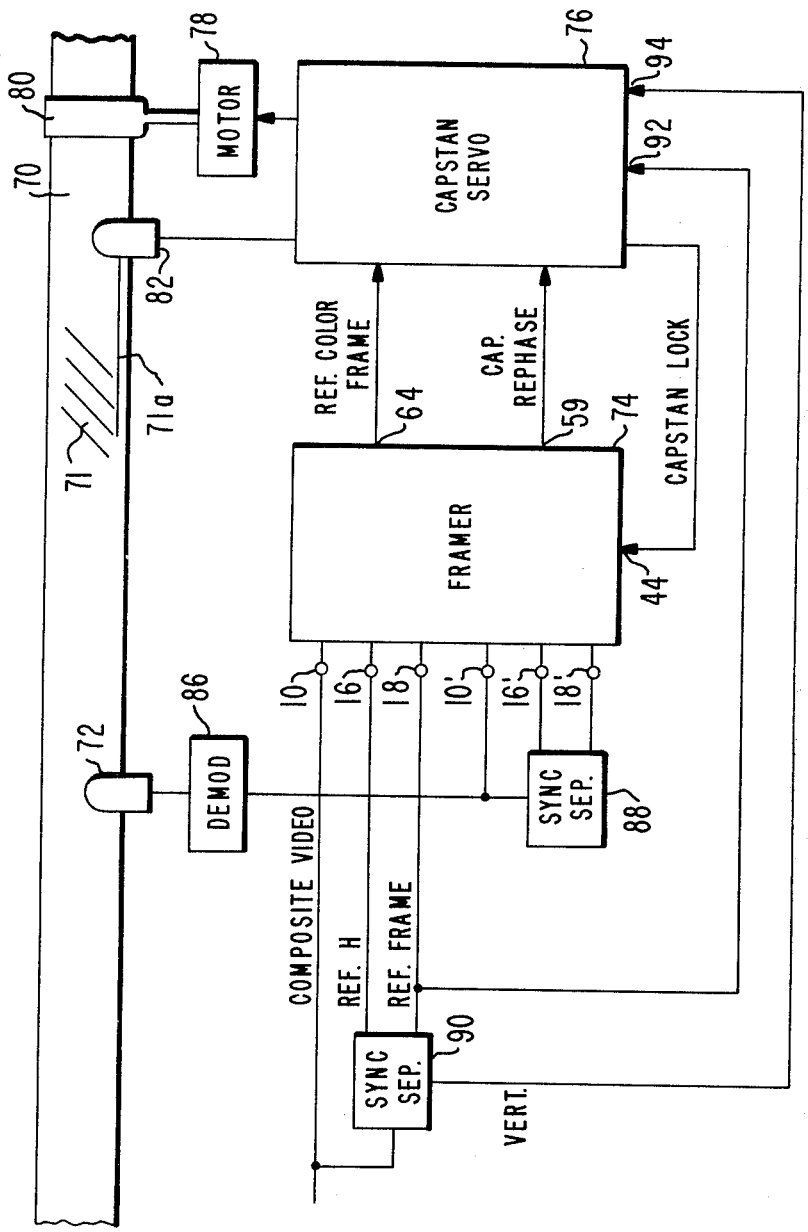
FIG. 1 shows a block diagram of a system using the framer in accordance with the invention.

FIG. 1 shows a tape 70 having video information recorded in tracks 71 and a control track 71a, which contains vertical sync, monochrome frame synchronization signals, and color framing edit pulses. Disposed next to tape 70 is a video pickup head 72 that applies the video information in tracks 71 to a demodulator 86, which in turn applies the demodulated video signal to sync separator 88 and to framer 74 input 10'. Separator 88 applies to terminal 16' separated horizontal synchronization pulses from tracks 71. Further, separator 88 supplies a monochrome framing signal to input 18'. This framing signal occurs when the leading edges of the horizontal and vertical synchronization pulses coincide, and therefore it can be generated by an AND gate within separator 88. Input 10 receives corresponding composite video signals from a reference synchronization generator (not shown). Sync separator 90 also receives the composite video signal and supplies horizontal sync and monochrome framing signals derived from the reference generator composite signal to inputs 16 and 18 respectively. Sync separator 90 also supplies the monochrome framing signal and a vertical sync signal to inputs 92 and 94 respectively of capstan servo 76. A reference color framing signal, i.e. one using the direction of zero crossing information, and a capstan rephasing signal, which causes the capstan to lock onto the next frame are generated by framer 74, and thus are applied from output terminals 64 and 59 respectively to capstan servo 76. Capstan servo 76 supplies a capstan lock signal to input terminal 44 of framer 74. It also controls the speed of a motor 78 that drives tape 70 by means of capstan 80. A head 82 picks up a control track signal on track 71a and applies it to capstan servo 76.

In operation, the tape 70 is assumed to have a recorded video signal thereon in tracks 71. Head 82 picks up the control track signal from track 71a on tape 70, and control track circuitry in the capstan servo 76 decodes a color framing edit pulse, a monochrome framing pulse, which has a frequency equal to one half the vertical frequency, and vertical sync signals. After the capstan servo 76 has achieved lock between the color framing signal on control track 71a from tape 70 and the reference signals at terminals 64, 92 and 94, the capstan servo 76 supplies a capstan lock signal to terminal 44 of the framer 74. However, this is not enough to ensure proper color framing since the recorded edit pulse may not be in synchronization with the recorded video in tracks 71. Framer 74 derives direction of zero crossing signals from the video signals applied to terminals 10, 16, and 18, compares them with those from tape 70 at terminals 10', 16', 18', and supplies at output 59 a capstan rephase signal which changes the phase of the reference color framing signal at terminal 64, unless there is coincidence between the direction of zero crossing signals. When such coincidence is not achieved, the capstan relocks to the new phase of the reference color framing signal at terminal 64 and a capstan lock signal is reapplied to terminal 44. One re-phasing cycle is enough for NTSC, but the process may have to be repeated up to three times for PAL, as explained above.

Figure 3:
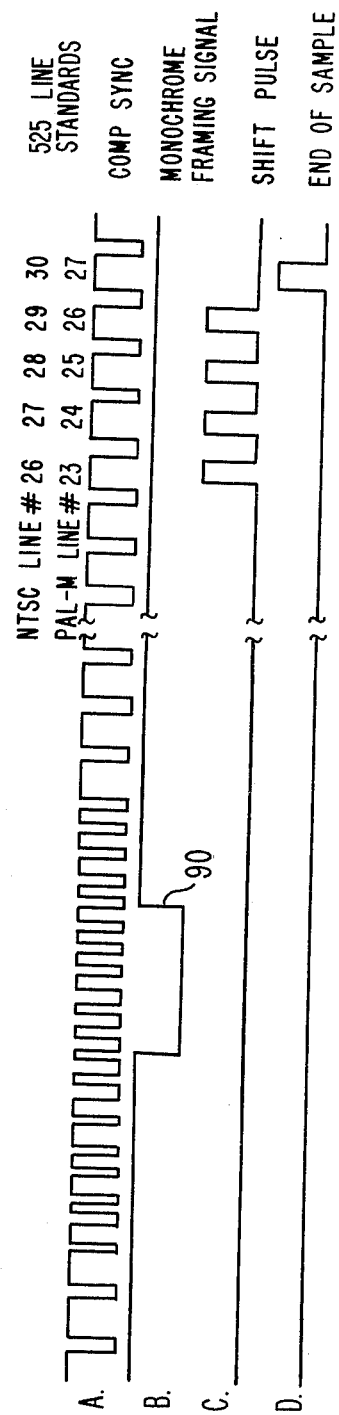
FIG. 3 shows some waveforms therein.
Figure 2A:
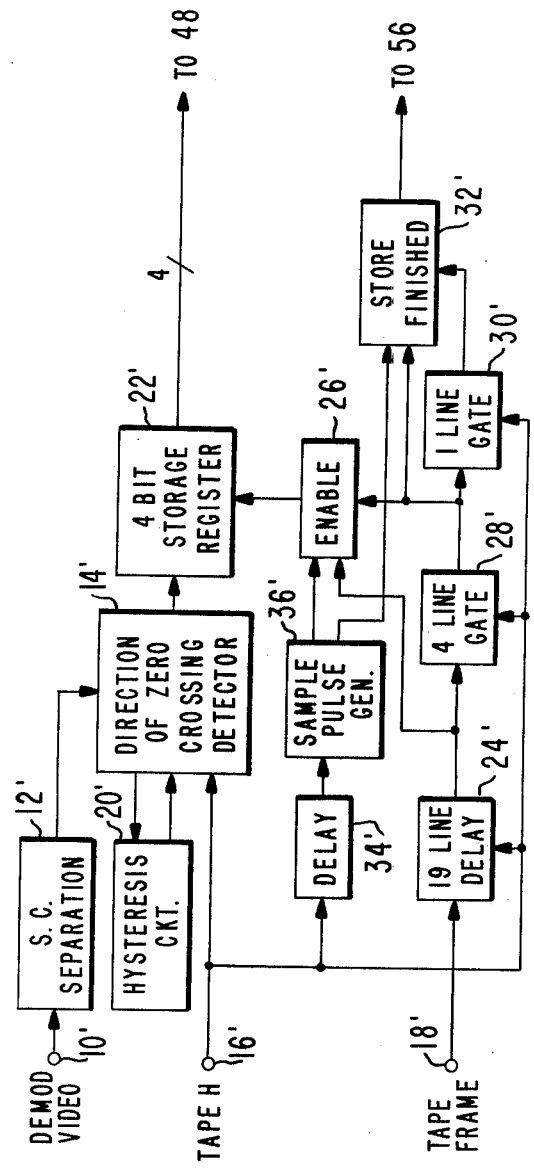
FIGS. 2a and 2b show block diagrams of the invention.
Figure 2B:
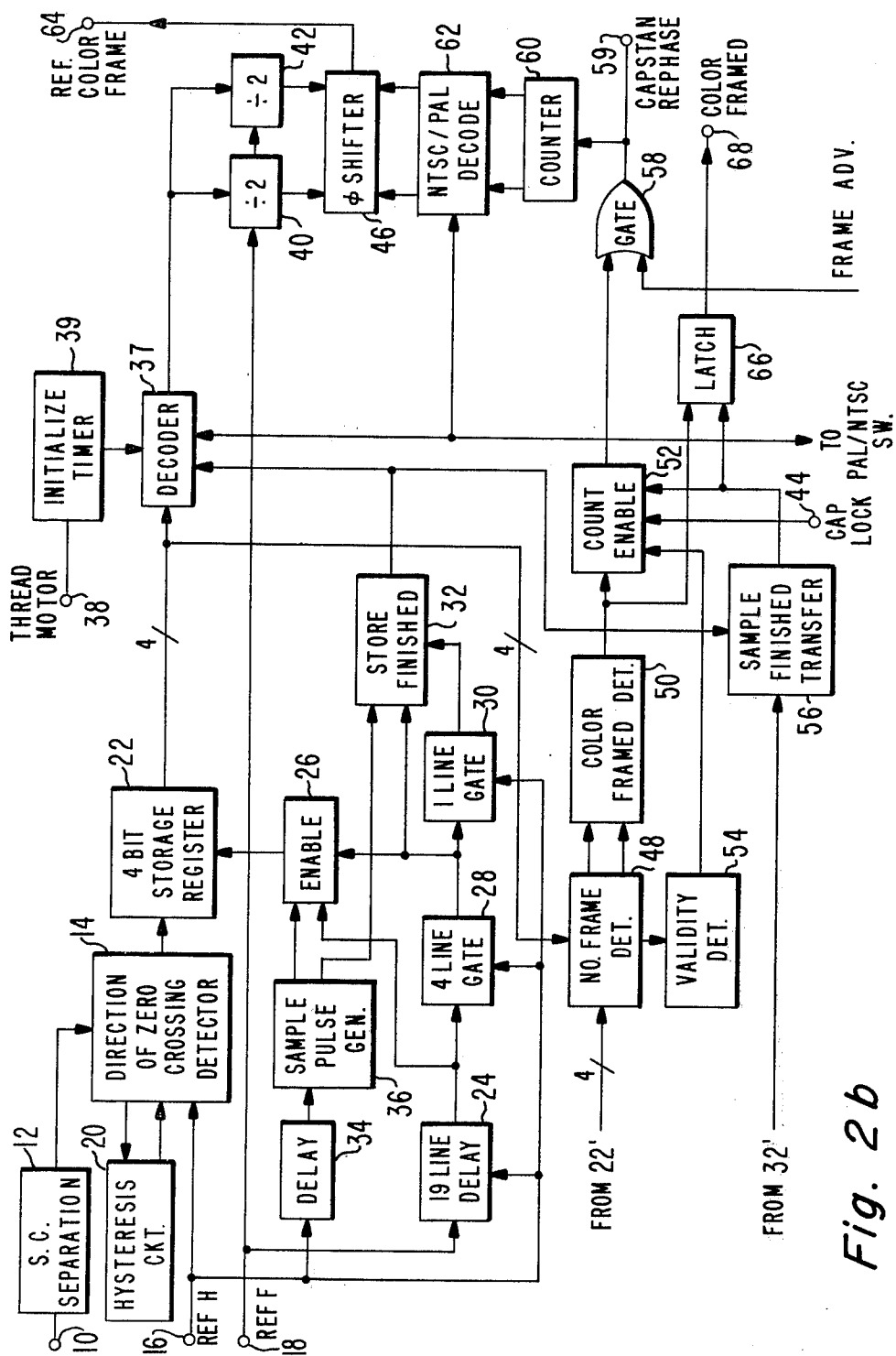

FIG. 2B shows in detail the framer 74, which has input 10 for receiving composite video. A subcarrier separator 12, which can be a filter, supplies the subcarrier in the composite video to a direction of zero crossing detector 14, which can sequentially comprise a squaring circuit, a differentiator, and a diode. Inputs 16 and 18 receive horizontal sync and monochrome framing pulses respectively from the reference synchronization generator, but they can also come from a recorded tape. The horizontal synchronization pulses are also applied to detector 14. This detector provides a high output signal to four bit register 22 whenever the direction of the first zero crossing of the subcarrier with respect to the horizontal synchronization pulse is positive, and a zero otherwise, although some other phase relationship could have been chosen. Because the phase of the color burst may be near the phase angles which define the difference between a positive and a negative going transition, ambiguity can occur in the output signal of detector 14. To overcome this problem hysteresis is deliberately introduced by a hysteresis circuit 20 to provide a smooth output signal from detector 14. A phase detector and hysteresis circuit are shown by FIG. 3, block 18 of U.S. Application Ser. No. 094,281, filed Nov. 19, 1979, in the name of Dennison & Walter.

The framing pulses at terminal 18 are shown in FIG. 3b, and are applied to a 19 line delay shift register 24. The shifting of register 24 is controlled by the horizontal synchronization pulses and starts at the end 90 of a framing pulse, which starts about line 5 in NTSC and ends during line 7. The output signal of register 24 goes high during line 26 for NTSC. This high signal is applied to enable circuit 26, which is an AND gate, and to four-line-gate 28, which is a shift register, and which applies a low signal to enable circuit 26 during line 30 for NTSC, and is also controlled for shifting by the horizontal sync pulses. Four pulses shown in FIG. 3c are passed through to enable circuit 26, four-line-gate 28 applies a high signal to a one-line-gate 30, which is also a shift register, during line 30 for NTSC, and to store 32, one-line-gate 30 supplies a low signal to store 32 during line 31 for NTSC. Store 32, which is an AND gate, supplies an end-of-sample pulse (FIG. 3d) on horizontal line 30 (26+4) to sample finished transfer circuit 56. The horizontal synchronization pulses are also supplied to a delay circuit 34 which may be formed for example as a one-shot multivibrator with a 20 microsecond delay, to cause the sample pulses, which are derived from the horizontal synchronization pulses, to occur in the middle of the horizontal lines. Another one-shot with a 20 microsecond delay comprises sample pulse generator 36, which supplies sample pulses to enable gate 26 and to store 32.

Shift pulses shown in FIG. 3c are applied to register 22 from gate 26 so that register 22 stores levels (high or low) indicating the phase relationship for lines 26-29 for NTSC or 23-26 for PAL. These lines occur at the same position of the picture for the two systems, but have different numbers due to the different numbering conventions for the two systems. A four bit parallel bus carries these levels to decoder 37. Decoder 37 compares these levels to a fixed code. This code is determined by whether a PAL or NTSC signal is being applied to the circuit, the decoder 37 is controlled by a signal from a manually operated PAL/NTSC switch (not shown). Terminal 38 receives a high signal that indicates that a threading operation is not going on and supplies this signal to initialize timer 39, which comprises a gate and a one shot, that delays the applying of a set signal from decoder 37 to dividers 40 and 42. This set signal is so applied when decoder 37 finds a match as explained above. Divider 40 receives the monochrome framing signal from terminal 18 and divides it by two. This divided signal is also divided again by two by divider 42. Both divided signals are applied to phase shifter 46, which supplies a reference color framing signal to terminal 64. In FIG. 2A, the terminals 10', 16', and 18' receive composite video, horizontal synchronization, and derived monochrome framing signals respectively from tape 70. Circuit elements indicated by a prime number have the same construction and functions as those indicated by corresponding unprimed numbers so a description will not be repeated. Frame detector 48 comprises exclusive OR gates and compares the four bits in each of the registers 22 and 22', and, if they are the same, color framed detector 50 supplies a high signal to count enable circuit 52, which also receives a capstan lock signal from terminal 44. In the meantime, validity detector 54 determines if the matching codes are valid in either PAL or NTSC. For example, NTSC has alternating phases, so that 1010 or 0101 are valid, while PAL has two identical consecutive bits, e.g. 1100 or 0011. Thus, e.g. if code 1110 is present, it is invalid, and detector 54 supplies a signal to prevent circuit 52 from providing an output signal. However, if the code is valid, and sample finish transfer circuit 56 indicates that sampling is complete, and if line 44 from the capstan servo indicates that the capstan servo is phase locked, then count enable circuit 52 provides a low signal to OR gate 58, if color framing was not detected as indicated by circuit 50. If a signal is received by gate 58 from a push button frame advance switch (not shown) or count enable circuit 52 (color frame not detected), a capstan rephase signal is applied to counter 60 and to the capstan servo through terminal 59. Further if gate 58 supplies a capstan rephase signal to counter 60, then NTSC/PAL decoder 62 controls phase shifter 46 to shift the reference color framing signal at terminal 64 by one frame. If NTSC, the framing signal is inverted, while if PAL, a ninety degree phase shift takes place. In either case, a one frame shift takes place. For NTSC this is sufficient, while for PAL this may not be enough. If not, then the framer repeats the operation until proper framing is achieved. Latch 66 supplies an indication signal to the operator, e.g. by lighting a light (not shown) coupled to terminal 68, when the color is not framed and the sampling operation is not finished.

What is claimed is:

1. A circuit for use with first color television signals from a record and from a source of standard second signals including horizontal synchronization pulses and a color burst, said circuit comprising first and second zero crossing detecting means for sensing the direction of zero-crossing of the color burst with respect to the preceding horizontal synchronization pulse for at least two consecutive lines of said first and second signals respectively, comparison means coupled to said first and second detection means for comparing said zero crossings in said signals, a source of framing signals, and means coupled to said comparison means and said source of framing signals for shifting the phase of said framing signal by one frame if said zero-crossing are not equal.

2. A circuit as claimed in claim 1, wherein each of said detection means determines the direction of zero crossings for four consecutive lines.

3. A circuit as claimed in claim 1, wherein each of said detection means comprises a direction of zero-crossing detector and a storage register coupled to said detector.

4. A circuit as claimed in claim 3, wherein said comparison means comprises a frame detector coupled to said registers.

5. A circuit as claimed in claim 1 wherein said source comprises a phase shifter.

6. A circuit as claimed in claim 5, wherein said means for shifting the phase comprises a NTSC/PAL decoder coupled to said phase shifter.

7. A method comprising detecting the direction of zero crossing of a color burst with respect to the preceding horizontal synchronization pulse of two color television signals respectively, comparing said zero crossings between said signals, supplying a framing signal, and shifting the phase of said framing signal by one frame if said detection of zero crossing are not equal.

8. A method as claimed in claim 7, wherein said determining step comprises detecting zero crossings for at least four consecutive lines.

* * * * *

UNITED STATES PATENT AND TRADEMARK OFFICE
CERTIFICATE OF CORRECTION

PATENT NO. : 4,261,008

DATED : April 7, 1981

INVENTOR(S) : Lloyd E. Waller, et al

It is certified that error appears in the above-identified patent and that said Letters Patent is hereby corrected as shown below:

At column 6, line 15 "detection" should be --direction--

Signed and Sealed this

Twenty-fifth Day of August 1981

[SEAL]

Attest:

*Attesting Officer*

GERALD J. MOSSINGHOFF

*Commissioner of Patents and Trademarks*